(12) United States Patent  (10) Patent No.: US 9,174,392 B2
Hartmann  (45) Date of Patent: Nov. 3, 2015

(54) METHOD AND DEVICE FOR SWITCHING A PARTICULATE MATERIAL FLOW IN THE CONSTRUCTION OF MODELS IN LAYERS

(75) Inventor: Andreas Dominik Hartmann, Stadtbergen (DE)

(73) Assignee: VOXELJET AG, Friedberg (DE)

( * ) Notice: Subject to any disclaimer, the term of this patent is extended or adjusted under 35 U.S.C. 154(b) by 109 days.

(21) Appl. No.: 13/378,487

(22) PCT Filed: Jun. 18, 2010

(86) PCT No.: PCT/DE2010/000687
§ 371 (c)(1),
(2), (4) Date: Dec. 15, 2011

(87) PCT Pub. No.: WO2010/149133
PCT Pub. Date: Dec. 29, 2010

(65) Prior Publication Data
US 2012/0097258 A1    Apr. 26, 2012

(30) Foreign Application Priority Data

Jun. 22, 2009  (DE) .................... 10 2009 030 113

(51) Int. Cl.
*B65B 31/00* (2006.01)
*B67C 3/00* (2006.01)
(Continued)

(52) U.S. Cl.
CPC .......... *B29C 67/0085* (2013.01); *B29C 67/0081* (2013.01); *Y10T 137/0396* (2015.04); *Y10T 137/8593* (2015.04)

(58) Field of Classification Search
CPC ............ B29C 67/0074; B29C 67/0077; B29C 67/0085; B29C 67/0081; B29C 41/12; B29C 31/02; B29K 2105/251; Y10T 137/0396; Y10T 137/8593
USPC ............. 222/200, 459, 1, 482–484, 195–196; 137/14; 427/197; 141/8, 21, 25, 46; 264/112
See application file for complete search history.

(56) References Cited

U.S. PATENT DOCUMENTS 2,640,629 A  6/1953  McDonald et al.
2,692,142 A  10/1954 Hunter
(Continued)

FOREIGN PATENT DOCUMENTS

DE  4 325 573  2/1995
DE  4 400 523  7/1995
(Continued)

OTHER PUBLICATIONS

International Search Report dated Oct. 28, 2010, for Corresponding PCT Application No. PCT/DE2010/000687 filed Jun. 18, 2040.
(Continued)

*Primary Examiner* — Frederick C Nicolas
*Assistant Examiner* — Matthew Lembo
(74) *Attorney, Agent, or Firm* — The Dobrusin Law Firm, P.C.

(57) ABSTRACT

The invention relates to a method for switching a particulate material flow in the construction of models in layers, wherein particulate materials are fed to a subsequent method step from a container having an opening in the direction of a workpiece platform. The particles in the container are exposed to a vacuum and to overpressure.

20 Claims, 3 Drawing Sheets

(51) Int. Cl.
  *B65B 1/04* (2006.01)
  *B65B 3/04* (2006.01)
  *B65G 69/06* (2006.01)
  *B67D 7/06* (2010.01)
  *D04H 1/20* (2006.01)
  *B29C 67/00* (2006.01)

(56) References Cited

U.S. PATENT DOCUMENTS

| | | | |
|---|---|---|---|
| 2,857,938 A | 10/1958 | Wahl | |
| 3,616,969 A | 11/1971 | Koizumi | |
| 3,616,972 A | 11/1971 | Christy | |
| 3,693,672 A * | 9/1972 | Hiland | 141/7 |
| 3,815,527 A | 6/1974 | Dobbins | |
| 3,858,628 A * | 1/1975 | Bendle | 141/46 |
| 3,884,401 A | 5/1975 | Winkler | |
| 3,913,503 A | 10/1975 | Becker | |
| 4,239,715 A | 12/1980 | Pratt | |
| 4,279,949 A | 7/1981 | Esser | |
| 4,369,025 A | 1/1983 | Von der Weid | |
| 4,456,154 A * | 6/1984 | Herriman | 222/325 |
| 4,579,252 A | 4/1986 | Wilson | |
| 4,630,755 A | 12/1986 | Campbell | |
| 4,669,634 A | 6/1987 | Leroux | |
| 4,889,433 A | 12/1989 | Pratt | |
| 4,938,816 A | 7/1990 | Beaman et al. | |
| 4,974,646 A * | 12/1990 | Martin et al. | 141/67 |
| 4,976,296 A * | 12/1990 | Pope | 141/46 |
| 5,017,753 A | 5/1991 | Deckard | |
| 5,053,090 A | 10/1991 | Beaman et al. | |
| 5,132,143 A | 7/1992 | Deckard | |
| 5,204,055 A | 4/1993 | Sachs et al. | |
| 5,252,264 A | 10/1993 | Forderhase et al. | |
| 5,275,215 A * | 1/1994 | Derby | 141/67 |
| 5,316,580 A | 5/1994 | Deckard | |
| 5,340,656 A | 8/1994 | Sachs et al. | |
| 5,354,414 A | 10/1994 | Feygin | |
| 5,387,380 A | 2/1995 | Cima et al. | |
| 5,433,520 A | 7/1995 | Adams | |
| 5,506,607 A | 4/1996 | Sanders, Jr. et al. | |
| 5,597,589 A | 1/1997 | Deckard | |
| 5,599,581 A | 2/1997 | Burton et al. | |
| 5,601,868 A | 2/1997 | Gerhardt | |
| 5,616,294 A | 4/1997 | Deckard | |
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,747,105 A * | 5/1998 | Haubert | 427/186 |
| 5,902,537 A * | 5/1999 | Almquist et al. | 264/401 |
| 5,934,343 A | 8/1999 | Gaylo et al. | |
| 6,036,777 A | 3/2000 | Sachs | |
| 6,094,994 A | 8/2000 | Satake et al. | |
| 6,147,138 A | 11/2000 | Hochsmann et al. | |
| 6,305,769 B1 | 10/2001 | Thayer et al. | |
| 6,316,060 B1 | 11/2001 | Elvidge et al. | |
| 6,318,418 B1 * | 11/2001 | Grossmann et al. | 141/59 |
| 6,322,728 B1 | 11/2001 | Brodkin et al. | |
| 6,405,095 B1 | 6/2002 | Jang et al. | |
| 6,416,850 B1 | 7/2002 | Bredt et al. | |
| 6,497,259 B1 * | 12/2002 | Wegman | 141/267 |
| 6,672,343 B1 * | 1/2004 | Perret et al. | 141/95 |
| 6,742,456 B1 | 6/2004 | Kasperchik et al. | |
| 6,764,636 B1 | 7/2004 | Allanic et al. | |
| 6,898,477 B2 | 5/2005 | Loughran | |
| 6,927,018 B2 | 8/2005 | Burgess | |
| 6,930,144 B2 | 8/2005 | Oriakhi | |
| 6,966,960 B2 | 11/2005 | Boyd et al. | |
| 6,983,188 B2 | 1/2006 | Loughran et al. | |
| 7,004,222 B2 * | 2/2006 | Ederer et al. | 164/155.1 |
| 7,219,970 B2 | 5/2007 | Cruz-Uribe et al. | |
| 7,220,380 B2 | 5/2007 | Farr et al. | |
| 7,229,144 B2 | 6/2007 | Nielsen et al. | |
| 7,258,736 B2 | 8/2007 | Oriakhi et al. | |
| 7,285,501 B2 | 10/2007 | Mardilovich et al. | |
| 7,290,221 B2 | 10/2007 | Anderson et al. | |
| 7,296,990 B2 | 11/2007 | Devos et al. | |
| 7,306,758 B2 | 12/2007 | Nielsen et al. | |
| 7,309,728 B2 | 12/2007 | Kasperchik | |
| 7,329,379 B2 | 2/2008 | Boyd et al. | |
| 7,348,075 B2 | 3/2008 | Farr et al. | |
| 7,365,129 B2 | 4/2008 | Kramer et al. | |
| 7,381,360 B2 | 6/2008 | Oriakhi et al. | |
| 7,389,154 B2 | 6/2008 | Hunter et al. | |
| 7,422,713 B2 | 9/2008 | Oriakhi et al. | |
| 7,435,072 B2 | 10/2008 | Collins et al. | |
| 7,435,367 B2 | 10/2008 | Oriakhi | |
| 7,435,763 B2 | 10/2008 | Farr et al. | |
| 7,455,805 B2 | 11/2008 | Oriakhi et al. | |
| 7,475,796 B2 * | 1/2009 | Garton | 222/185.1 |
| 7,497,977 B2 | 3/2009 | Nielsen et al. | |
| 7,499,611 B2 | 3/2009 | Kornilovich | |
| 7,625,512 B2 | 12/2009 | Cruz-Uribe et al. | |
| 7,645,403 B2 | 1/2010 | Nielsen et al. | |
| 7,700,020 B2 | 4/2010 | Nielsen et al. | |
| 7,790,074 B2 | 9/2010 | Pan et al. | |
| 7,794,636 B2 | 9/2010 | Collins et al. | |
| 7,829,000 B2 | 11/2010 | Farr et al. | |
| 7,833,005 B2 | 11/2010 | Hunter et al. | |
| 8,033,812 B2 | 10/2011 | Collins et al. | |
| 8,182,078 B2 | 5/2012 | Nakhmanovich et al. | |
| 8,449,079 B2 | 5/2013 | Ge et al. | |
| 8,474,954 B2 | 7/2013 | Gore | |
| 8,540,505 B2 | 9/2013 | Farr et al. | |
| 8,573,740 B2 | 11/2013 | Rivas et al. | |
| 8,587,093 B2 | 11/2013 | Mardilovich et al. | |
| 8,609,198 B2 | 12/2013 | Figueroa et al. | |
| 8,714,710 B2 | 5/2014 | Rivas et al. | |
| 8,916,334 B2 | 12/2014 | Ganapathiappan et al. | |
| 8,960,845 B2 | 2/2015 | Benedicto et al. | |
| 2004/0012112 A1 | 1/2004 | Davidson et al. | |
| 2004/0038009 A1 | 2/2004 | Leyden et al. | |
| 2004/0170765 A1 | 9/2004 | Ederer et al. | |
| 2004/0207662 A1 | 10/2004 | Anderson et al. | |
| 2005/0014005 A1 | 1/2005 | Kramer et al. | |
| 2005/0017386 A1 * | 1/2005 | Harrysson | 264/40.1 |
| 2005/0023719 A1 | 2/2005 | Nielsen et al. | |
| 2005/0029175 A1 | 2/2005 | Farr et al. | |
| 2005/0046067 A1 | 3/2005 | Oriakhi et al. | |
| 2005/0072113 A1 | 4/2005 | Collins et al. | |
| 2005/0093194 A1 | 5/2005 | Oriakhi et al. | |
| 2005/0093208 A1 | 5/2005 | Boyd et al. | |
| 2005/0280185 A1 * | 12/2005 | Russell et al. | 264/308 |
| 2006/0091199 A1 | 5/2006 | Loughran | |
| 2006/0095152 A1 | 5/2006 | Loughran | |
| 2006/0105102 A1 | 5/2006 | Hochsmann et al. | |
| 2006/0175346 A1 | 8/2006 | Ederer et al. | |
| 2006/0254467 A1 | 11/2006 | Farr et al. | |
| 2006/0257579 A1 | 11/2006 | Farr et al. | |
| 2007/0026102 A1 | 2/2007 | Devos et al. | |
| 2007/0126157 A1 * | 6/2007 | Bredt | 264/334 |
| 2008/0047628 A1 * | 2/2008 | Davidson et al. | 141/18 |
| 2008/0241404 A1 * | 10/2008 | Allaman et al. | 427/333 |
| 2013/0026683 A1 | 1/2013 | Ng et al. | |
| 2013/0287933 A1 | 10/2013 | Kaiser et al. | |
| 2015/0035820 A1 | 2/2015 | Le et al. | |

FOREIGN PATENT DOCUMENTS

| | | |
|---|---|---|
| DE | 100 47 614 A1 | 4/2002 |
| DE | 101 05 504 A1 | 8/2002 |
| DE | 696 34 921 T2 | 12/2005 |
| DE | 201 22 639 U1 | 11/2006 |
| DE | 10 2005 056 260 A1 | 6/2007 |
| DE | 10 2009 030 113 A1 | 12/2010 |
| EP | 0 224 621 A1 | 6/1987 |
| EP | 0 318 247 A1 | 5/1989 |
| EP | 0 688 262 | 12/1995 |
| EP | 0 431 924 B1 | 1/1996 |
| EP | 1520686 A2 | 4/2004 |
| EP | 1415791 A1 | 5/2004 |
| EP | 1562876 A2 | 5/2004 |
| EP | 1442870 A1 | 8/2004 |

(56) References Cited

FOREIGN PATENT DOCUMENTS

| | | |
|---|---|---|
| EP | 1452298 A1 | 9/2004 |
| EP | 1491322 A2 | 12/2004 |
| EP | 1491516 A2 | 12/2004 |
| EP | 1491517 A2 | 12/2004 |
| EP | 1498277 A1 | 1/2005 |
| EP | 1510310 A2 | 3/2005 |
| EP | 1524098 A1 | 4/2005 |
| EP | 1527860 B1 | 5/2005 |
| EP | 1527861 A2 | 5/2005 |
| EP | 1541321 A2 | 6/2005 |
| EP | 1524117 A3 | 7/2005 |
| EP | 1721875 A2 | 11/2006 |
| EP | 1764208 A2 | 3/2007 |
| EP | 1775103 A2 | 4/2007 |
| EP | 1594677 B1 | 7/2007 |
| EP | 1524049 B1 | 8/2009 |
| EP | 1512519 B1 | 8/2011 |
| EP | 1486318 A2 | 10/2013 |
| JP | 2005041219 A | 2/2005 |
| JP | 2005111988 A | 4/2005 |
| JP | 2005132111 A | 5/2005 |
| JP | 2005132112 A | 5/2005 |
| JP | 2009107352 A | 5/2009 |
| WO | 95/18715 A1 | 7/1995 |
| WO | 98/28124 A2 | 7/1998 |
| WO | 00/78485 A2 | 12/2000 |
| WO | 01/26885 A1 | 4/2001 |
| WO | 01/34371 A2 | 5/2001 |
| WO | 01/72502 A1 | 10/2001 |
| WO | 02/26419 A1 | 4/2002 |
| WO | 02/26420 A1 | 4/2002 |
| WO | 02/083323 A2 | 10/2002 |
| WO | 03/016030 A1 | 2/2003 |
| WO | 03/016067 A2 | 2/2003 |
| WO | 03/086726 A1 | 10/2003 |
| WO | 03/097518 A2 | 11/2003 |
| WO | 03/103932 A1 | 12/2003 |
| WO | 2004/01661 A1 | 11/2004 |
| WO | 2004/112988 A2 | 12/2004 |
| WO | 2005/009723 A1 | 2/2005 |
| WO | 2005/032802 A1 | 4/2005 |
| WO | 2005/044544 A1 | 5/2005 |
| WO | 2005/0080010 A1 | 9/2005 |
| WO | 2005/113219 A1 | 12/2005 |
| WO | 2006/036366 A2 | 4/2006 |
| WO | 2008/022615 A2 | 2/2008 |
| WO | 2008/055615 A1 | 5/2008 |
| WO | 2008/114240 A3 | 9/2008 |
| WO | 2010/149133 A1 | 12/2010 |
| WO | 2011/126492 A1 | 10/2011 |
| WO | 2011/126493 A1 | 10/2011 |
| WO | 2013/113372 A1 | 8/2013 |
| WO | 2013/187914 A1 | 12/2013 |
| WO | 2014/077848 A1 | 5/2014 |
| WO | 2014/158159 A1 | 10/2014 |
| WO | 2014/178834 A1 | 11/2014 |
| WO | 2014/193406 A1 | 12/2014 |
| WO | 2014/204450 A1 | 12/2014 |
| WO | 2014/204476 A1 | 12/2014 |
| WO | 2015/012862 A1 | 1/2015 |

OTHER PUBLICATIONS

International Preliminary Report on Patentability dated Jan. 4, 2012, for Corresponding PCT Application No. PCT/DE2010/000687 filed Jun. 18, 2010
Written Opinion dated Dec. 22, 2011, for Corresponding PCT Application No. PCT/DE2010/000687 filed Jun. 18, 2010.
Copending National Phase Application, WO 02/083323, Oct. 24, 2002.
Copending National Phase Application, WO 03/086726, Oct. 17, 2005.
Copending Niational Phase Application, WO 05/080010, Sep. 1, 2005.
Copending National Phase Application, WO 08/022615, Feb. 28, 2008.
Opposition of Patent No. DE1004761 4, Jun. 12, 2003.
Opposition to European Patent No. 1322458 B1, Jan. 19, 2005.
International Search Report, PCT/DE02/01103, (Published as WO2002/083323), Sep. 30, 2004.
International Search Report, PCT/DE00/03324, (Published as WO2002/026419), Jun. 5, 2001.
International Search Report, PCT/DE01/03661. (Published as WO2002/026420), Feb. 28, 2002.
Cima et al., "Computer-derived Microstructures by 3D Printing: Bio-and Structural Materials," SFF Symposium, Austin, TX, 1994.
EOS Operating Manual for Laser Sintering Machine with Brief Summary.
Jacobs et al., 2005 SME Technical Paper, title "Are QuickCast Patterns Suitable for Limited Production?"
Marcus et al., Solid Freedom Fabrication Proceedings, Nov. 1993.
Marcus et al., Solid Freeform Fabrication Proceedings, Sep. 1995, p. 130-33.
Sachs et al., "Three-Dimensional Printing: Rapid Tooling and Prototypes Directly from a CAD Model", Massachusetts Institute of Technology, pp. 131-136.
Sachs et al., "Three-Dimensional Printing: Rapid Tooling and Prototypes Directly from a CAD Model", Massachusetts Institute of Technology, pp. 143-151.

* cited by examiner

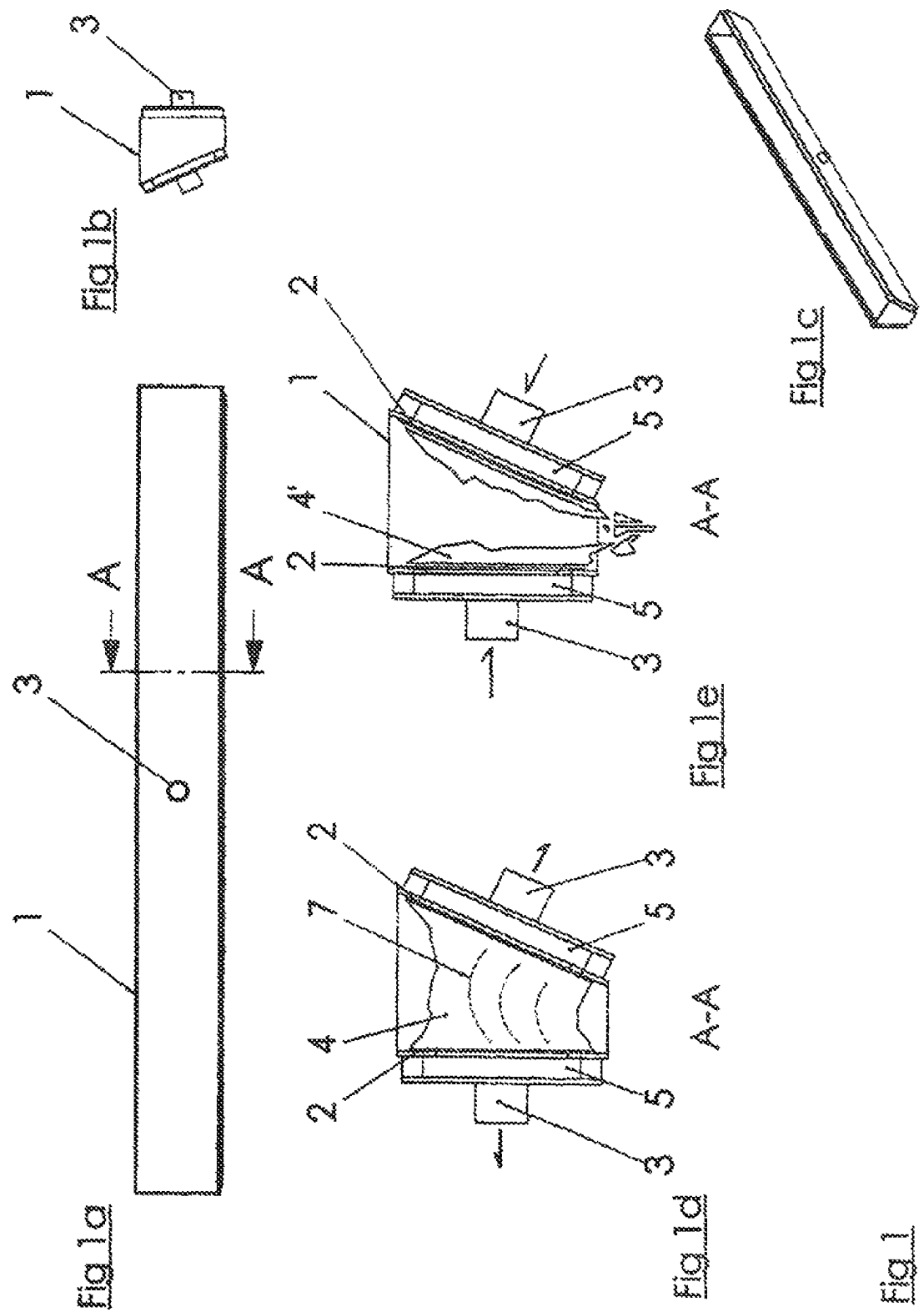

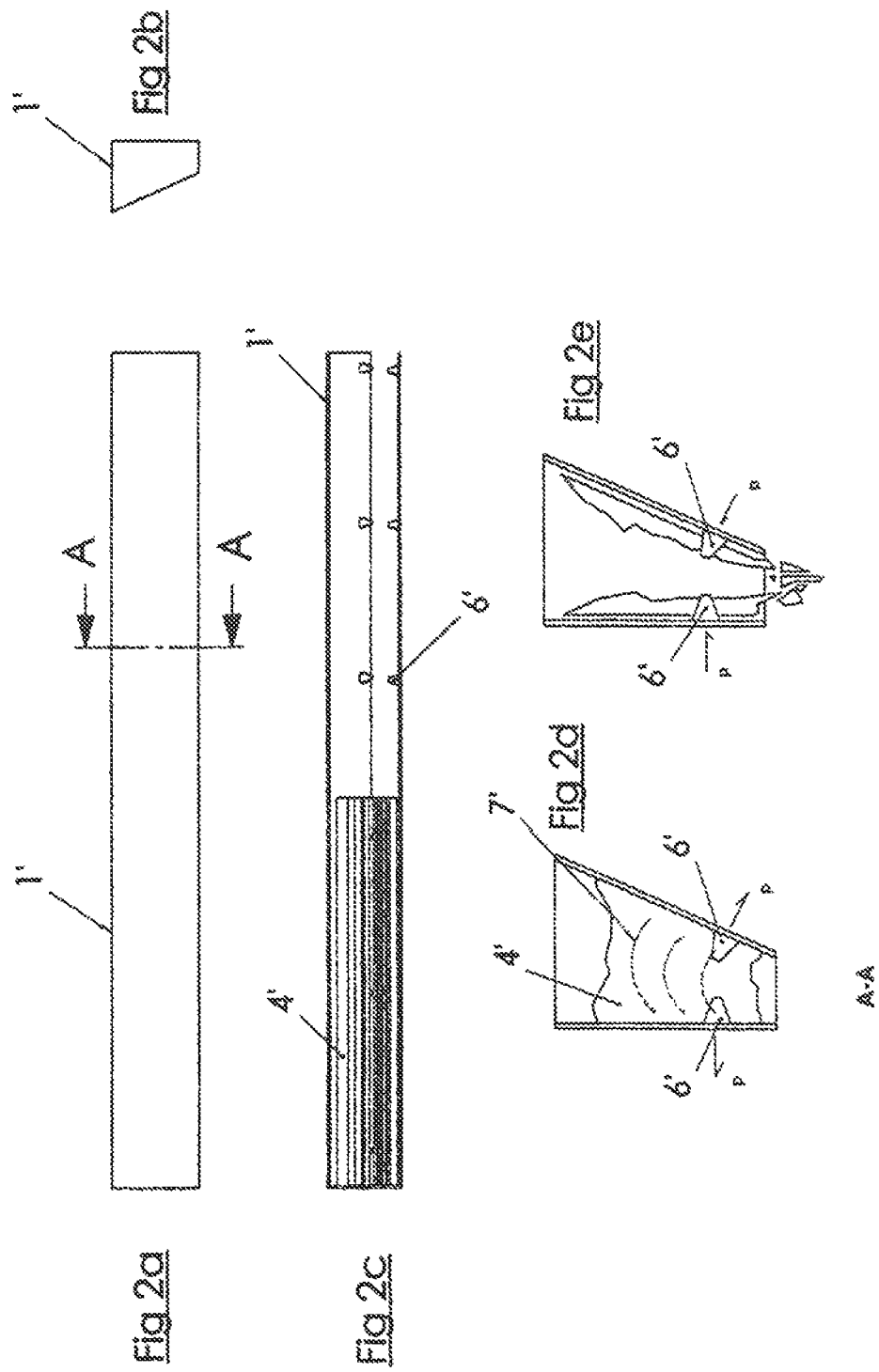

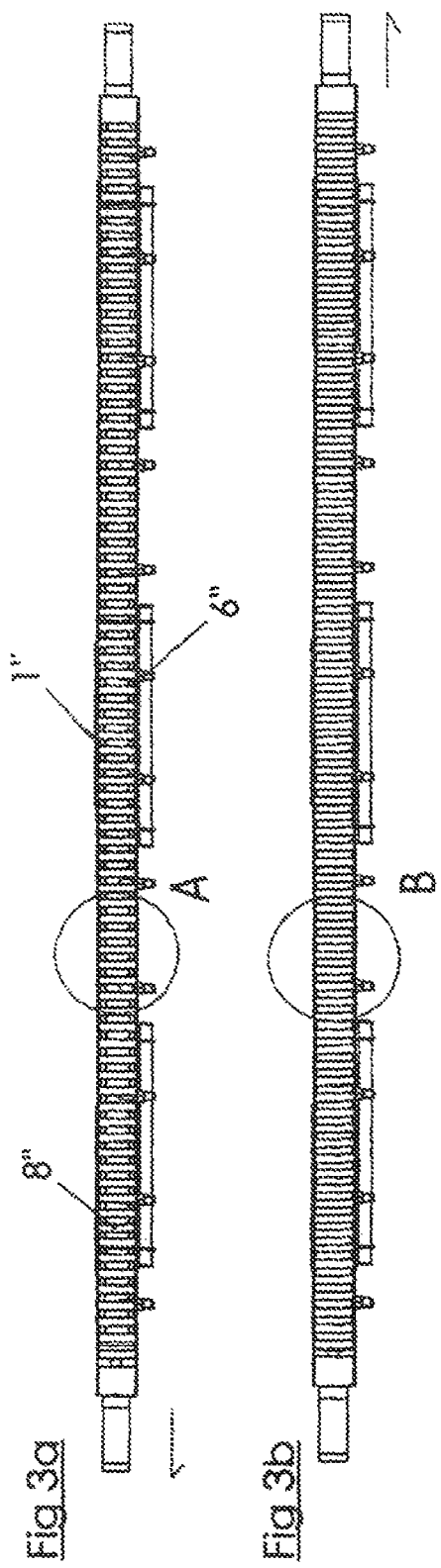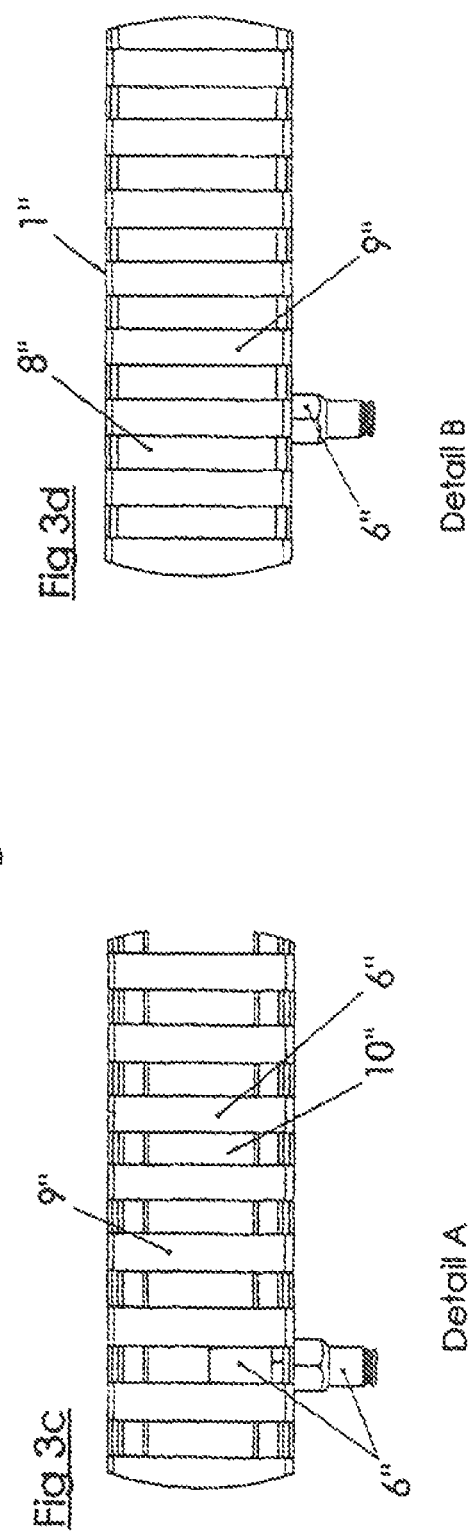

METHOD AND DEVICE FOR SWITCHING A PARTICULATE MATERIAL FLOW IN THE CONSTRUCTION OF MODELS IN LAYERS

CLAIM OF BENEFIT OF FILING DATE

The present application claims the benefit of the filing date of PCT Application Serial No. PCT/DE2010/000687 (filed Jun. 18, 2010) (Published as WO2010/149133) and DE 10 2009 030 113.5 (filed Jun. 22, 2009), the contents of which are hereby incorporated by reference in their entirety.

Invention relates to a method and a device for switching a particulate material flow in the construction of models in layers, where—from a container having an opening in the direction of a workpiece platform—particulate material is supplied to the subsequent process step.

In general, methods for production of three-dimensional components have already been known for some time.

For example, the European patent specification EP 0 431 924 B1 describes a method for production of three-dimensional objects from computer data. Here, a particulate material is applied in a thin layer onto a platform and this, by means of a print head, is selectively imprinted with a binder material. The particulate area imprinted with the binder bonds and hardens under the influence of the binder and, if necessary, an additional hardener. Afterwards, the platform is lowered by one layer thickness into a construction cylinder and equipped with a new layer of particulate material, which is also imprinted, as described on top. These steps are repeated, until a certain, desired height of the object is achieved. From the imprinted and hardened areas, thus, a three-dimensional object results.

This object made from hardened particulate material is embedded after its completion in loose particulate material and afterwards is released from it. This occurs, for example, by means of an extractor. The desired objects then remain, which are subsequently released from the residual powder, for example by wire brushing.

Other powder-supported rapid prototyping processes also work in a similar manner, as for example selective laser sintering or electron beam sintering where, in each case, loose particulate material is also applied in layers and is selectively cured with the help of a controlled physical radiation source.

Hereinafter, all these processes are summarized under the concept "three-dimensional printing processes" or 3 D printing processes.

With state-of-the-art technology of known 3 D printing processes, the particulate material is usually applied with the help of a coating unit. This coating unit must be equipped—in the event of a low filling situation—with particulate material from a stock container.

For this, various state-of-the-art methods and devices are known.

For instance, WO 98/28124 A1 describes a method where the powder material is pushed via a piston onto a workspace and is applied from there via rollers onto the area to be coated.

Furthermore, a device is known from WO 00/78485 A2 for filling of a coater where—in a final position of the coater—a stock container is arranged above the same and said stock container has a sliding seal and this sliding seal can be opened when required and thus the coating device can be filled.

From the same first publication of the patent application, a device is known by means of which extraction of the particulate material from the reservoir to the coater occurs via a conveyor belt.

Furthermore, it is described in WO 2003/97518 how to extract the particulate material from the stock container and transport it via a slide valve into the coater system. On this occasion, the slide valve always transports the same quantity of fluid into a coater. Since the recoater—during operation—is emptied irregularly across the length and the same quantity of particulate material is always supplied to the coater, a powder surplus may result in some areas. Then this powder surplus is emptied, if necessary, in order to get a uniform level of powder material in the recoater. Therefore, the construction effort of such a device is also significant, beside the complex operation.

Also, conveyor equipment is known from US 2004/0012112A1, which uses a belt transport system with pit cages for transport of particulate material to the coater.

Another option to transport particulate material from a stock container into a coater system is described in DE 10 2005 056 260 A1. Here, the coater unit—in the case of a low fill level—is filled with particulate material from a stock container in such a manner that the fill level in the coater unit—even with previously irregular fill level—will reach a predetermined level across the entire coater length.

With these methods and devices known from the state of the art for filling of a coater unit for particulate material, it has turned out disadvantageous that the control unit of the bulk material flow needs a mechanically complex seal, and that the containers—as a result of a possible formation of powder bridges and/or material cones—can only be emptied with difficulty.

From the state of the art, it is widely known that the outflow behavior of the medium in powder form can be improved by mechanical vibration excitation of the medium in powder form by means of the container. This can occur, for example, by means of mechanical actuators in order to destroy the powder bridges.

Beyond this, the medium in powder form can also be directly mechanically stimulated. Thus, mechanically moved actuators like slide valves, chains or rakes can be provided for destroying powder bridges in the powder stock.

In addition, mechanical fasteners are provided to control the powder discharge.

Among the rest, the disadvantages of mechanical stimulation are as follows:

A. In the case of discharge inhibition, other bridges can form under stimulation and/or existing bridges will be further reinforced.
B. Vibrations can transmit themselves unintentionally to other parts of a system and influence these negatively.
C. The design of a vibration system is elaborate.
D. The effect of the vibrations depends on the filling level of the container. Because the fill level changes during emptying, the effect is computable only with difficulty.
E. The motion bearings of all mechanical components could be blocked by the media in powder form, which can lead to an increased breakdown risk. Sealing of the bearings is costly and complex.
F. All mechanical components are subject to mechanical wear and with it to an increased failure risk.
G. Mechanically moved seals must be designed as tight as possible for particulate material so as to prevent material loss. In addition, their bearing has to have a narrow clearance, something which, however, on the other hand, also favors jamming by penetrating particulate material.

Furthermore, it is known from WO 2008/055615 A1 and DE 101 05 504 that, for fluidization of powder material, gas is introduced into the powder mass.

Besides, with a rapid prototyping process, there is another difficulty in the fact that the coater is very long and narrow, but must be filled very evenly across its entire length. In addition, there is usually only a very short time window available for this.

Furthermore, it is also important to keep powder loss during filling of the coater or recoater as low as possible because the disposal of the waste sand is cost-intensive with a sand process.

Hence, it is the task of the present invention to provide a method and a device with which it is possible to easily empty the stock container.

This task is solved by a method as described at the beginning, where the particulate material is supplied inside the container with vacuum and with excess pressure. The material in powder form can be thereby hardened, preferably locally, and be loosened and with this, its flow can be controlled.

Beyond this, these tasks are solved with a device for switching a particulate material flow in the construction of models in layers, wherein particulate materials are fed to a subsequent method step from a container having an opening in the direction of a workpiece platform and wherein means to expose the particulate materials to a vacuum and to overpressure in the container are provided.

According to a preferential version of the invention, the vacuum supply leads to a local solidification of the particulate material and hence, if applicable, also to a discharge stop of the particulate material from the opening of the container. An excess pressure supply of the particulate material, on the other hand, leads to loosening and hence to discharge of the powder material from the opening of the container.

Here, in a particularly preferential version, exposure to excess pressure and vacuum occurs via porous materials as for example tissue whose mesh size or pore width is smaller than the smallest grain size or the smallest diameter of the particulate material to be switched.

This leads to a local solidification of the medium in powder form.

The solidification of the medium in powder form prevents the discharge of the bulk material.

The porous materials are preferably attached to the walls directly above the discharge opening. The process requires that the containers are tapered towards the opening.

The technique of air injection is used also with discharge problems from silos, in order to increase process reliability. However, all devices of the state of the art use an explicit element for the switching of the powder flow, as for example a slide valve, a squeezing valve, a star wheel or similar and not the excess pressure or vacuum.

With the combination of the technologies to create excess pressure and vacuum on the container walls, switching can be realized according to powder flow properties. Then the reliability of the switching behavior will depend on the powder flow properties or bridge formation properties of the particulate material to be switched.

With such a method, it is possible to use nearly any discharge geometry for stock containers. For example, the container may have opposing walls, such as opposing walls that are generally vertical.

It is especially advantageous when the method that the invention proposes is used to supply media in powder form from the container to a coater.

However, it is as possible that media in powder form from the container are supplied to a workpiece platform.

Beside the use of air connections and chambers, the exposure to vacuum or excess pressure can occur according to a preferential version of the invention by means of nozzles attached to or in the container.

With an especially preferential version, it can be intended that the nozzles can be controlled individually through independent valves and are then activated either simultaneously or not simultaneously.

The individual control of air allows a safe release of local solidifications, as the whole of the available total pressure is concentrated on the point of loosening.

Furthermore, the individual control of the nozzles prevents that the significant pressure drop in a blown-out nozzle can affect the other nozzles.

With the individual control, injection of a big air volume is possible in an extremely short time at a concentrated volume.

With this, the hardened places are bust up, explosion-type.

The individual control of the nozzles is therefore also very economical, because air is used only where and when it is necessary. These properties are also advantageous if energy savings measures are to be considered because compressed air must be generated at great energetic cost.

According to the version, concurrent or non-concurrent control of the valves can make sense. If, for example, there is no risk that a nozzle can blow itself free and pressure flow is available to a high amount, the concurrent control of all nozzles may be a cheaper solution.

If several nozzles are arranged inside the container, a movement scheme into the powder material can be initiated with a certain control sequence.

In the preferential invention, the nozzles are arranged, for example, and are activated one after the other in very short succession. A wave spreading out length-wise is thereby generated in the medium in powder form, which has an especially favorable effect on its discharge behavior.

The nozzles can be also be specifically arranged and controlled, as experience has shown, by flow behavior in certain geometrical containers.

For instance, in narrow template containers, which are filled length-wise via an auger, it was found that the material is more prominently compressed in the front area of the auger. At these places, several nozzles can be arranged or an individual nozzle can be activated more than once.

It has also proven to be advantageous if—with a method according to the present invention for generating of the excess pressure—gases are introduced into the fluid. Here, the gas—according to a particularly preferential version—may include air, humidified air, heated air, inert gases and/or reactive components.

The device that the invention proposes has turned out, in particular, to be very advantageous when a length of the container amounts to a multiple of its width.

Here, the container can be a container from which fluids are supplied to a coater or, however, a container from which fluids are supplied to a workpiece platform.

As already mentioned, with one device that the invention proposes, according to a particularly preferential version, it is suggested that, inside or on the container, there are nozzles for supply of gases.

On this occasion, it can be advantageous if the nozzles can be activated independently of each other. Here, activation of the nozzles can occur via valves.

If sieves are also provided inside the container, then a device such as the invention proposes allows for sucking off air on the walls, for example, by using fine-meshed grids. This leads to a local solidification of the medium in powder form. The solidification of the medium in powder form, hence, prevents the discharge of the bulk material.

In doing so, preferably, the openings of the container can be sealed up, in addition, through sieve arrays corresponding to the opening. In doing so, it could be the case, for example, that the sieves can be shifted into each other in such a manner that they can seal the opening and open it up again.

In addition, a mechanical slide valve can be provided for sealing the opening intended in the container.

Other advantageous arrangements arise from the sub-claims and the design examples described on the following pages.

For a closer explanation, the invention is described in more detail, with the help of preferential design examples, on the following pages, with reference to the drawing.

Here, the drawing shows the following:

FIG. 1 a coater filling process according to the first preferential version of the present invention, in various views;

FIG. 2 a coater filling process according to another preferential version of the present invention, in various views; and FIG. 3 a coater filling process according to another version of the present invention, view from below.

FIG. 1 shows a stock container and hopper 1 for a coater. FIG. 1a) shows a side view, 1b) a front view of 1a 1c) a three-dimensional representation of the container 1, 1d) represents a section through the hopper from 1a) along the line AA in a loaded closed state. FIG. 1e) has an illustration according to FIG. 1d) but in closed state.

The recoater of a device, for example, for the rapid prototyping process, is usually very long and very narrow. The recoater filling device and/or container 1 has the task of filling the recoater across the length—free of loss and very evenly—with media 4 in powder form.

Here, the recoater filling device 1 is also a long, narrow container which is arranged above the recoater and is open at the bottom or at least can be opened.

The discharge behavior of a material in powder form is usually influenced by the following circumstances:

Geometry of the container. The longer, narrower and shallower the angle of the funnel of the container, the greater the risk of bridge formation in the medium and thus of bulk material flow inhibition.

Surface texture of the internal container walls. The larger the surface area/rougher the inner walls, the greater the risk of bridge formation in the medium and thus of bulk material flow inhibition.

Opening width of the funnel spout. The smaller the discharge cross section for the medium, the greater the risk of bridge formation in the medium and thus of bulk material flow inhibition.

Physical property of the medium in powder form. Every medium in powder form has different flow properties and hence also different inclinations when it comes to the formation of bridges. If the medium is still moist, this worsens the flow behavior even more.

The problems of existing solutions are thereby remedied according to the shown preferential version of the present invention by the fact that bridge formation and/or local hardening of the medium in powder form is specifically used as a seal.

According to the design version of the invention shown in FIG. 1, fine-meshed grids or fabric 2 arranged on the walls of the container 1 are used to suck out air through an air connection 3 by means of pressure chambers 5 arranged in the container walls.

The medium 4 in powder form comes thus in contact with a sieve exposed to a vacuum or with fabric or similar porous material 2, through which bulk material particles cannot escape, but such an underpull can be introduced into the bulk material that powder bridges 7 or similar solidifications of the powder material will form.

This leads to a solidification of the medium 4 in powder form and the formation of bridges 7. The bridges 7 thus prevent the discharge of the bulk material and/or fluid 4.

The dissolution of the formed bridges 7 is achieved by injecting air. The friction to the wall is dissolved, the bridges 7 are destroyed. The fluid 4 can flow off.

For this, excess pressure can also be introduced through a sieve-like inlet in such a manner into the bulk material 4 that no bulk material particles can get into the supply air and the bulk material bridges 7 are destroyed for sure.

In any case, it might be advantageous if excess pressure is introduced through air nozzles in such a manner into the bulk material 4 that no bulk material particles can get into the supply air and the bulk material bridges 7 are destroyed for sure.

Injection of air can be also used as support of a mechanical seal. Here, a preferential solution is a container 1 which, in addition, has a slide valve seal on the underside.

The bridges described above 7/7' can also be built by means of smaller extraction nozzles 6', if, for example, there is no room for vacuum tanks 5.

Such a version is shown in FIG. 2. FIG. 2a) shows a side view of such a container 1', 2b) a sectional view along A-A, 2c) is a top view onto container 1' in partially fluid-filled 4' and unfilled state, 2d) corresponds to FIG. 2b), although the view is somewhat more precise and the container 1' is in a loaded, closed state. FIG. 2e) is a view corresponding to FIG. 2d), although the container 1' is in an open state here.

Here, the container 1' has—on the inside of its side walls—some nozzles 6', which are arranged in a specific pattern. Every nozzle 6' is activated via a separate valve, regardless of the other nozzles 6'. A control unit only ever activates one valve. Thus, a blown-out nozzle 6' in the medium has no more influence on the other nozzles 6'. A greater starting pressure can be achieved which busts up a bridge 7' explosion-type and air consumption is reduced.

According to the design example described, several nozzles 6' are used for the destruction of the bulk material bridges 7'. Thus, good results can be achieved if the nozzles 6' are switched alternately to the compressed air supply, so that every nozzle 6' supplies the bulk material with the same output.

The destruction of the fluid bridges 7' in the container 1' can occur by impact-type or explosive-type injection of air through the individual nozzles 6', and every nozzle 6' can be individually activated through a separate valve and is switched successively. Hence, the nozzles blow independently of each other and, therefore, a blown-out nozzle 6' has no more influence on the other nozzles 6'.

The medium in powder form can also be specifically moved, owing to different turning-on schemes of the nozzles. Thus an undulation can be achieved along of the container by serial turning on and switching off, under observance of certain activation times, something that particularly favors the discharge behavior.

With such a version, it has turned out to be advantageous in particular that the injection instance is very short and, hence, does not dry up the powder. This has turned out, in particular, to be advantageous when using sand fortified with hardener, since its physical properties should not change substantially before application.

This construction does not only mean savings in terms of air consumption; it does also not require a lot of space.

According to a particularly preferential version of the present invention, the successive intervals of the nozzles are set to about 0.05 seconds.

In order to avoid drying out of the powder/fluid mixtures 4/4', the injected air can also be humidified.

Now, according to the present invention, it is possible to switch and control a flow of fluids 4/4' triggered by gravity and/or vibrations, whereby the switching or control is achieved through the specific formation and destruction of fluid or bulk material bridges 7/7' by means of vacuum and excess pressure exposure of the bulk material 4/4'. In doing so, and with the aim of formation of a bulk material bridge 7/7', a vacuum is introduced into the bulk material 4/4' in such a manner that the flow resistance in the bulk material 4/4' gives rise to the formation of pull forces between the bulk material particles which lead to the solidification of the material in powder form and/or to bridge formation.

For the dissolution of already generated bridges or solidifications 7/7', an excess pressure is then used, which reduces the frictional forces between the particles until the bridge 7/7' is destroyed.

Under certain conditions, the material can also be loosened if the vacuum is simply switched off.

On this occasion, powder flow coming out of a container can be adjusted by means of bulk material padding, generated through vacuum, in the discharge opening—relative to the flow rate.

In addition, the containers 1/1' can absolutely—in order to increase the reliability of the seal—also have a simple mechanical slide valve underneath the array.

In FIG. 3, for example, container 1" is shown in a view from below, so that a possible additional seal mechanism is visible. FIGS. 3a and 3c show container 1", respectively in an open and FIGS. 3b and 3d, in a closed state, whereas FIGS. 3c and 3d constitute the enlarged views of the areas A and B.

As FIG. 3 shows, the opening of the container is provided with a grid 8" according to the preferential version shown, and said grid can be closed in an open state preferably through a slide valve 9" and can also be shifted so that gaps 10" result and discharge of fluid is possible in the open state.

The injected or extracted air can also be used for specific adjustment of bulk material properties according to dampness and temperature.

Furthermore, it is also possible that the injected air can be used to introduce additional reaction components into the bulk material 4/4'.

In the version described, sand mixed with a hardener is applied on a panel during a rapid prototyping process by means of a recoater or a coater. In doing so, the recoater—after every applied layer—is refilled by a coater filling device 1, as shown in the drawing, to an equal level. Here, the recoater filling device 1 is preferably positioned solidly on the panel edge and, for filling, the recoater moves under the recoater filling device. Between the recoater and the recoater filling device 1, there is only a minimum gap as this happens.

The recoater filling device 1, according to the version shown, basically consists of the following three main parts: distributor pipe with auger in order to fill the stock container evenly with sand and to ventilate the stock container; the stock container, which absorbs the filling volume; and a seal unit, which seals off the stock container without any loss and evenly "cuts off" the filling volume of the recoater.

Filling device 1 opens, on the underside, a slide valve seal 9" (see FIG. 3). For this, a pneumatic cylinder presents a thin metal sheet, canted for reinforcement, with transverse slots 10" and the stock container can empty its sand into the recoater. In order to bust bridges in the sand volume, sintered nozzles 3, 6', 6" are arranged in a pattern above the seal, and these can be supplied from the outside with compressed air. According to the described version, every nozzle 6', 6" can be supplied with air via a separate valve. After opening the seal, every nozzle 6', 6" is successively opened, individually, in the millisecond range. The bridge is destroyed by explosion-type injection of air. Nevertheless, no fluidization takes place. On this occasion, excessive air can escape upwards via a vent pipe. After the filling process, the slide valve seal is closed by the opposite pneumatic cylinder. In doing so, the seal slide valve cuts off the sand's connection with to reservoir and thus ensures an even filling level across the entire recoater length. This is followed by filling of the stock container by means of distributor pipe and auger. On this occasion, the bridges originate from pushing the auger, and the bridges are later disbanded by the injection device.

What is claimed is:

1. A system for production of three-dimensional models comprising:
   a workpiece platform for layer-wiser application of a particulate material;
   a coating device for repeated application of layers of the particulate material to the workpiece platform; and
   a filling device for filling the coating device with the particulate material, wherein the filling device includes a container having two opposing walls and an opening in the direction of the workpiece platform for feeding to the coating device, the opening not being sealed off from the environment around the filling device, the filling device includes a means for exposing the particulate material to vacuum and excess pressure for controlling the flow of the particulate material from the filling device, wherein the means for exposing the particulate material includes at least one connector to each of the opposing walls for i) providing vacuum from the opposing walls for forming a bridge of the particulate material between the two opposing walls and ii) providing excess pressure for destroying the bridge;
   wherein the two opposing walls are flat and tapered inwardly, and the intersection of the opposing walls with the horizontal plane are parallel lines; a length of the container is a multiple of a width of the container so that the opening of the container is long and narrow for filling the coating device across a length of the coating device.

2. The system according to claim 1, wherein in or on the container, nozzles are provided for supply of gases.

3. The system according to claim 1, wherein the nozzles are independently activated.

4. The system according to claim 3, wherein valves are provided for activation of the nozzles.

5. The system according to claim 4, wherein porous materials, whose pore size is smaller than a smallest diameter of the particulate material, are arranged in the container.

6. The system according to claim 1 wherein porous materials, whose pore size is smaller than a smallest diameter of the particulate material, are arranged in the container.

7. The system according to claim 1, wherein the filling device includes sieve arrays for sealing the opening of the container.

8. The system according to claim 7, wherein a mechanical slide valve is provided for sealing of the opening in the container.

9. The device according to claim 1, wherein the opposing walls have a plurality of openings for applying the vacuum along the length of the opposing walls.

10. A method for construction of models in layers comprising the steps of:
    forming a bridge of a particulate material in a container of a filling device by exposing the particulate material to a vacuum from two opposing walls of the container, wherein the opposing walls are flat and tapered inwardly and the intersection of the opposing walls with a horizontal plane are parallel lines;

applying a first layer of the particulate material to a workpiece platform using a coating device;

destroying the bridge by impacting the bridge with an excess pressure;

feeding the particulate material from the filling device to the coating device for filling the coating device with the particulate material, and applying an additional layer of the particulate material over the first layer using the coating device;

wherein the container of the filling device has an opening in the direction of the workpiece platform, the opening not being sealed off from the environment around the filling device, wherein the feeding of the particulate material from the filling device is controlled by exposing the particulate material in the container to the vacuum for forming the bridge and to the excess pressure for destroying the bridge; and wherein a length of the container is a multiple of a width of the container so that the opening of the container is long and narrow for filling the coating device across a length of the coating device.

11. The method according to claim 10, wherein the method includes the step of moving the coating device to a final position when a fill level of the particulate material in the coating device is low, where the filling device is arranged above the final position; wherein the exposing of the particulate material to a vacuum stops a discharge of the particulate material from the opening of the container and the excess pressure leads to the discharge of the particulate material from the opening of the container.

12. The method according to claim 11, wherein the process includes a step of locally solidifying the particulate material with the vacuum.

13. The method according to claim 12, wherein the step of exposing the particulate material to the vacuum or the excess pressure occurs by means of porous materials provided in or on the container, wherein a pore width of the porous materials is smaller than a smallest diameter of the particulate material and that gases are supplied and extracted through the porous materials.

14. The method according to claim 10, wherein the particulate material is solidified locally due to the vacuum.

15. The method according to claim 10, wherein the exposing of the particulate material to the vacuum or the excess pressure occurs by means of porous materials provided in or on the container, wherein a pore width of the porous materials is smaller than a smallest diameter of the particulate material and that gases are supplied and extracted through the porous materials.

16. The method according to claim 10, wherein the filling device includes nozzles for exposing the particulate material to the vacuum or the excess pressure and the process includes individually controlling the nozzles via independent valves.

17. The method according to claim 16, wherein the individual control of the nozzles, in the case of one nozzle freeing up, will prevent a drop in pressure at the other nozzles.

18. The method according to claim 10, wherein the exposing the particulate material to excess pressure includes introducing gases into the particulate material.

19. The method according to claim 10, wherein the process further comprises a step of selectively imprinting a binder on an area of the particulate material of the first layer, and a step of selectively imprinting the binder on an area of the particulate material of the additional layer, wherein the binder bonds to the particulate material, and wherein the layer-wise application of the particulate material and the imprinting of the binder are repeated until a desired height of the object is achieved; wherein the imprinting of the binder employs a print head.

20. The method of claim 10, wherein the vacuum is applied via openings along the length of the opposing walls.

* * * * *